(12) United States Patent
Zhang

(10) Patent No.: US 8,368,808 B2
(45) Date of Patent: Feb. 5, 2013

(54) CAMERA MODULE HAVING A ROTATABLE IMAGING UNIT AND PORTABLE ELECTRONIC DEVICE

(75) Inventor: Yu Zhang, Shenzhen (CN)

(73) Assignees: Shenzhen Futaihong Precision Industry Co., Ltd., Shenzhen (CN); FIH (Hong Kong) Limited, Kowloon (HK)

( * ) Notice: Subject to any disclaimer, the term of this patent is extended or adjusted under 35 U.S.C. 154(b) by 571 days.

(21) Appl. No.: 12/629,108

(22) Filed: Dec. 2, 2009

(65) Prior Publication Data

US 2010/0141830 A1 Jun. 10, 2010

(30) Foreign Application Priority Data

Dec. 10, 2008 (CN) .......................... 2008 1 0306089

(51) Int. Cl.
*H04N 5/225* (2006.01)
*H04H 40/00* (2008.01)

(52) U.S. Cl. ........ 348/376; 348/374; 348/375; 348/373; 455/3.06

(58) Field of Classification Search .......... 348/373–376; 455/3.06
See application file for complete search history.

(56) References Cited

U.S. PATENT DOCUMENTS

| | | | | |
|---|---|---|---|---|
| 4,690,531 A * | 9/1987 | Hansen et al. | | 396/62 |
| 5,592,221 A * | 1/1997 | Mielke | | 348/270 |
| 6,516,148 B1 * | 2/2003 | Kim et al. | | 396/72 |
| 7,054,073 B2 * | 5/2006 | Shirie | | 359/699 |
| 7,286,862 B2 * | 10/2007 | Lee et al. | | 455/575.4 |
| 7,577,352 B2 * | 8/2009 | Chang | | 396/144 |
| 7,742,100 B2 * | 6/2010 | Yoo et al. | | 348/373 |
| 7,891,889 B2 * | 2/2011 | Zhang | | 396/428 |
| 2003/0169166 A1 * | 9/2003 | Parsadayan | | 340/500 |
| 2003/0174240 A1 * | 9/2003 | Wada et al. | | 348/374 |
| 2004/0080667 A1 * | 4/2004 | Jeong et al. | | 348/374 |
| 2004/0095500 A1 * | 5/2004 | Sato et al. | | 348/340 |
| 2004/0204064 A1 * | 10/2004 | Ikeda et al. | | 455/556.1 |
| 2005/0001922 A1 * | 1/2005 | Lee et al. | | 348/340 |
| 2005/0013606 A1 * | 1/2005 | Yang et al. | | 396/429 |
| 2005/0049019 A1 * | 3/2005 | Lee | | 455/575.4 |
| 2005/0054377 A1 * | 3/2005 | Yeh | | 455/556.1 |
| 2005/0162545 A1 * | 7/2005 | Jeon | | 348/373 |
| 2005/0261041 A1 * | 11/2005 | Im | | 455/575.3 |
| 2006/0197863 A1 * | 9/2006 | Kim | | 348/335 |
| 2006/0261257 A1 * | 11/2006 | Hwang | | 250/216 |
| 2007/0010284 A1 * | 1/2007 | Park | | 455/550.1 |
| 2008/0076347 A1 * | 3/2008 | Chang | | 455/3.05 |
| 2008/0194303 A1 * | 8/2008 | Takagi et al. | | 455/575.3 |
| 2011/0043683 A1 * | 2/2011 | Beach et al. | | 348/373 |

FOREIGN PATENT DOCUMENTS

| | | |
|---|---|---|
| CN | 1538715 A | 10/2004 |
| CN | 1578333 A | 2/2005 |
| CN | 1794595 A | 6/2006 |
| CN | 1832509 A | 9/2006 |
| KR | 10-2006-031052 A | 12/2006 |

* cited by examiner

*Primary Examiner* — Aung S Moe
*Assistant Examiner* — Chia-Wei A Chen
(74) *Attorney, Agent, or Firm* — Altis Law Group, Inc.

(57) ABSTRACT

A camera module and a portable electronic device using same are provided. The camera module can be rotated to align with a first camera window and a first aperture in the front of the portable electronic device or a second camera window and second aperture in the rear of the portable electronic device.

11 Claims, 5 Drawing Sheets

CAMERA MODULE HAVING A ROTATABLE IMAGING UNIT AND PORTABLE ELECTRONIC DEVICE

CROSS-REFERENCE TO RELATED APPLICATION

This application is related to co-pending U.S. patent application Ser. Nos. 12/624,837 and 12/605,703, entitled "CAMERA MODULE AND PORTABLE ELECTRONIC DEVICE USING SAME". Such applications have the same assignee as the present application. The above-identified applications are incorporated herein by reference.

BACKGROUND

1. Technical Field

The present disclosure relates to camera modules, and particularly to a camera module used in a portable electronic device.

2. Description of Related Art

Camera modules are often provided in portable electronic devices, such as digital cameras, mobile phones, and personal digital assistants, to provide the device with an imaging function (e.g., still and/or video photography). A typical camera module includes a lens barrel and a lens assembly received in the lens barrel. The portable electronic device includes a camera window on its rear surface and a display on its front surface. The camera window is aligned with the lens assembly and allows the outside light to penetrate to the lens assembly for image capture by the camera module. However, it is difficult for a user to take a self-portrait while simultaneously observing the image shown on the display.

Therefore, there is room for improvement within the art.

BRIEF DESCRIPTION OF THE DRAWING

Many aspects of the new camera module and portable electronic device using the same can be better understood with reference to the following drawings. The components in the drawings are not necessarily drawn to scale, the emphasis instead being placed upon clearly illustrating the principles of the new camera module and portable electronic device using the same. Moreover, in the drawings, like reference numerals designate corresponding parts throughout the several views.

DETAILED DESCRIPTION

Figure 1:
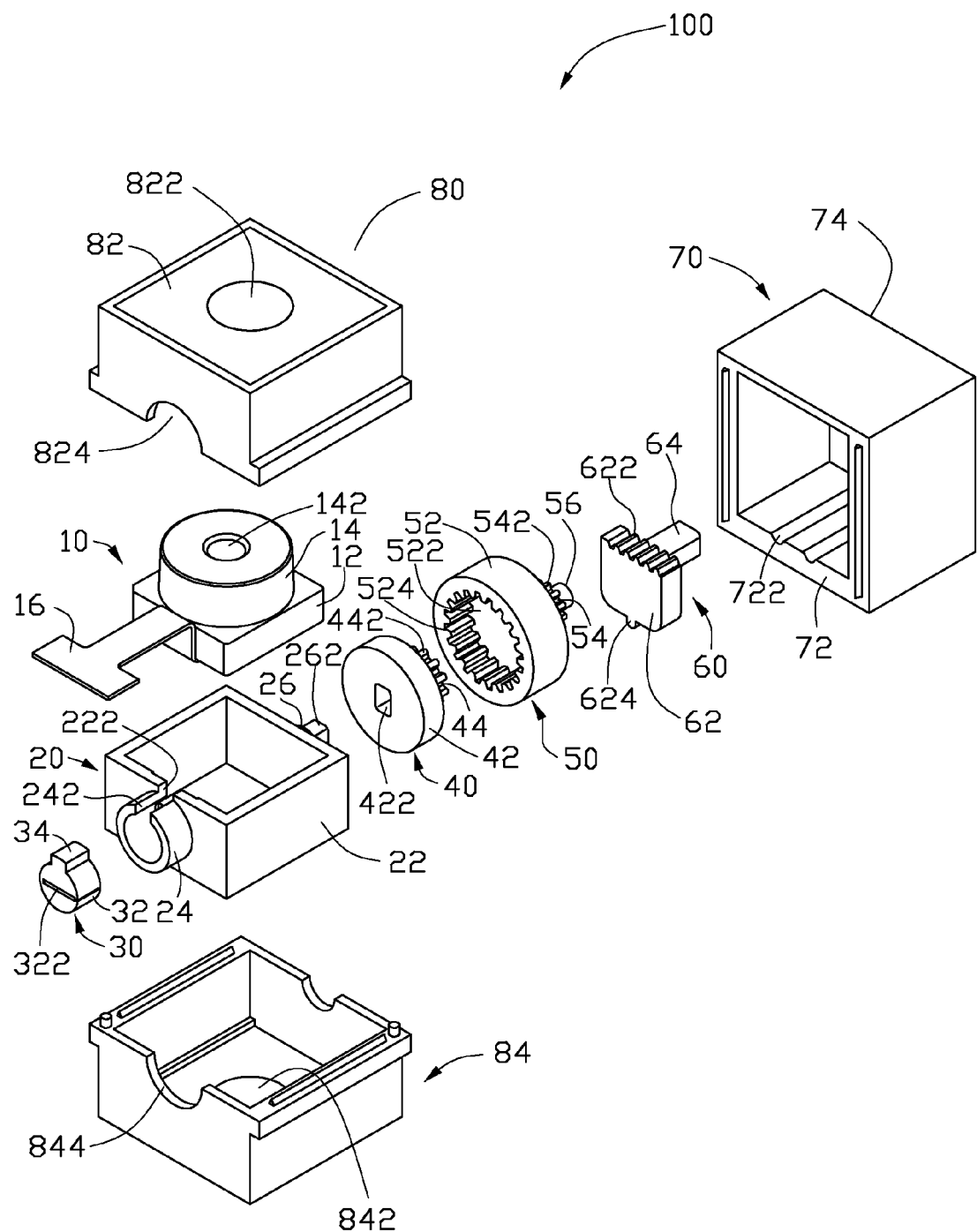
FIG. 1 is an exploded, isometric view of a camera module according to an exemplary embodiment.
Figure 2:
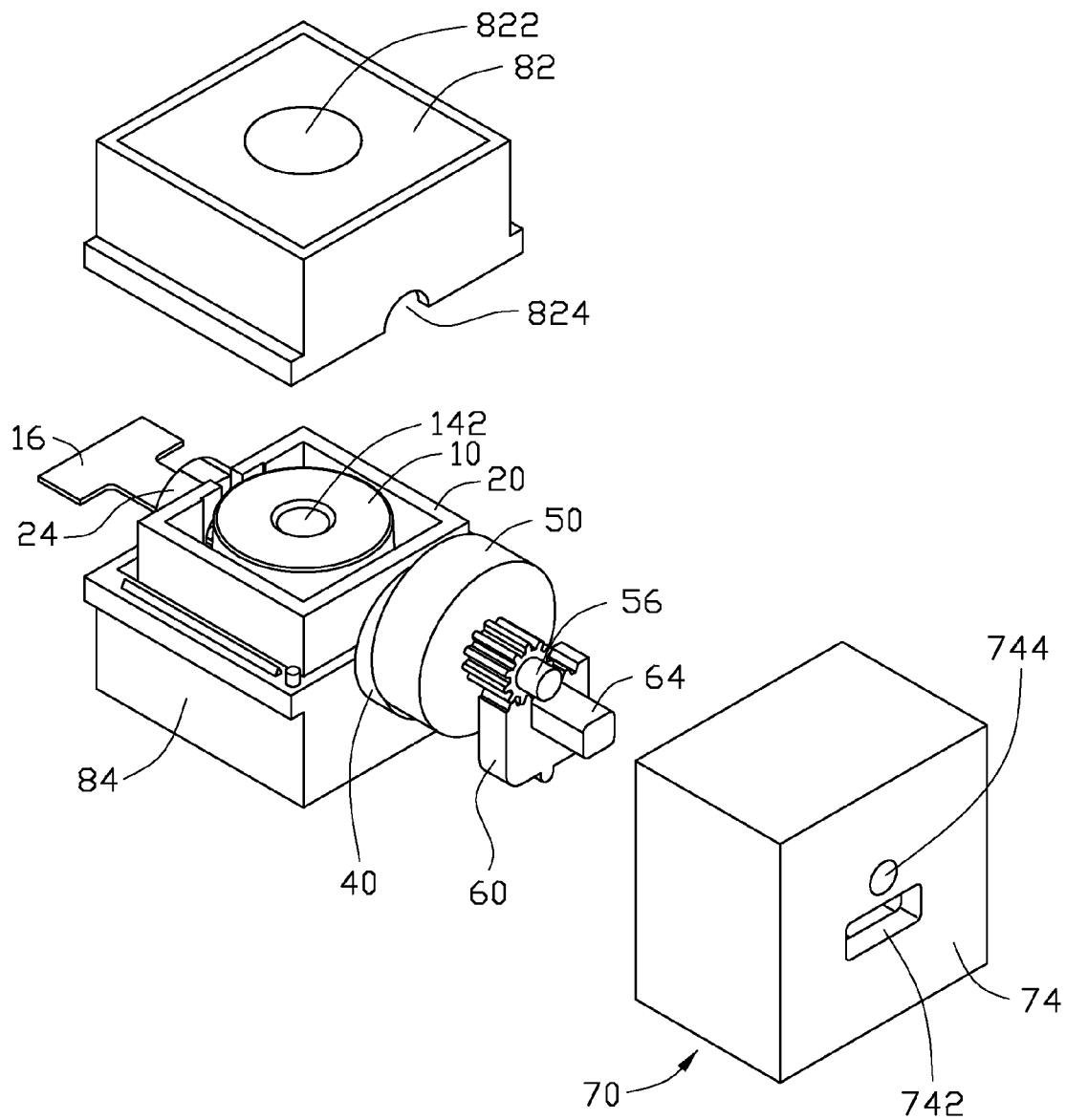
FIG. 2 is an isometric view of part of the camera module at an assembled position shown in FIG. 1.
Figure 3:
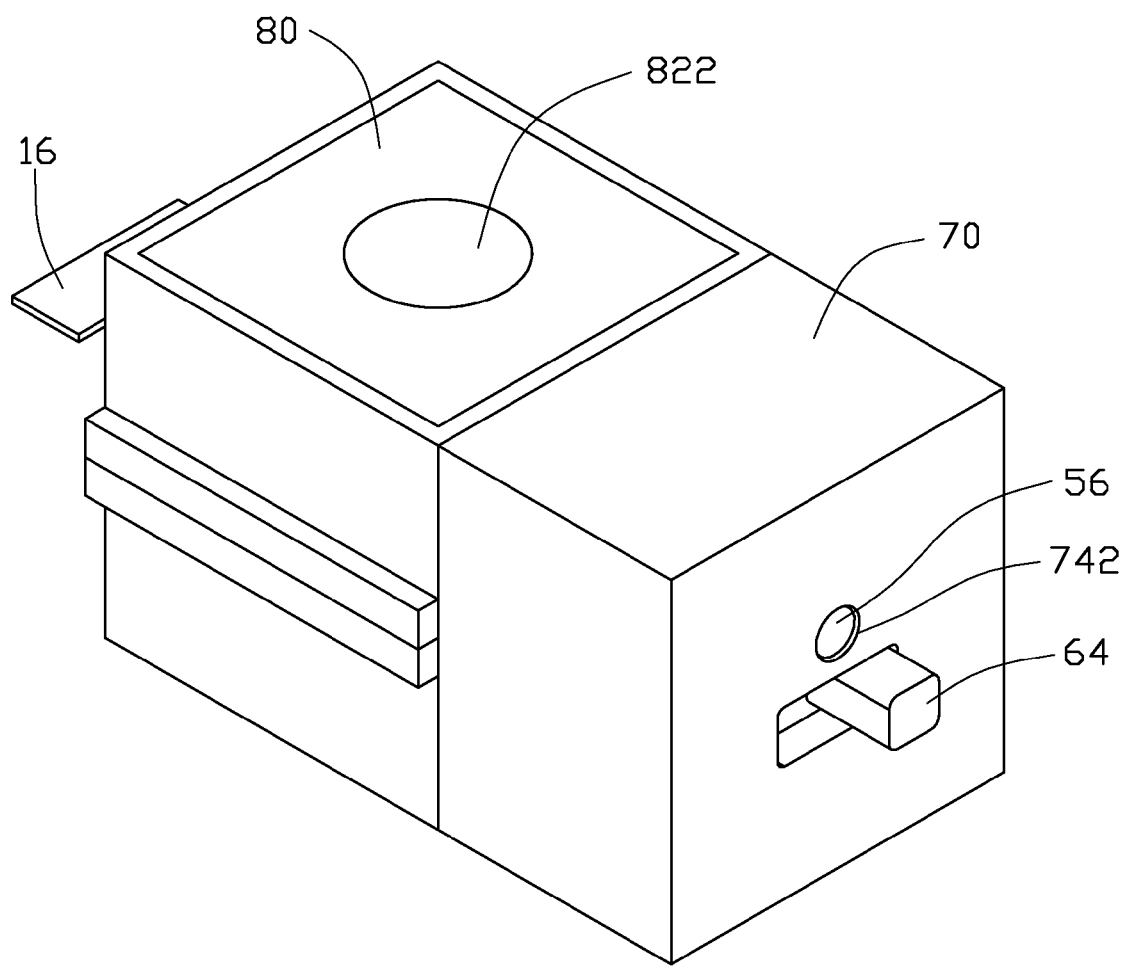
FIG. 3 is another isometric view of the camera module at an assembled position shown in FIG. 1.

FIGS. 1 through 3 show an exemplary camera module 100 including an imaging unit 10, a securing case 20, a rotary disk 40, a transmission follower 50, a handle member 60, a mounting member 70, and a receiving box 80.

The imaging unit 10 includes a flexible printed circuit board 16, a base seat 12, and a lens barrel 14 connect to the base seat 12. The lens barrel 14 includes a lens assembly 142.

The lens assembly 142 is received in the lens barrel 14. The flexible printed circuit board 16 is rotatably secured to the lens barrel 14.

The securing case 20 includes a peripheral wall 22, a sleeve portion 24, and a shaft portion 26. The sleeve portion 24 and the shaft portion 26 protrude from opposite sides of the peripheral wall 22. The sleeve portion 24 is hollow and communicates with the inside of the securing case 20. The peripheral wall 22 defines a cutout 222 communicating with a slot 242 defined through the sleeve portion 24. The sleeve portion receives a holding portion 30 therein. The holding portion 30 includes a main portion 32 and a projection portion 34 positioned on the peripheral wall of the main portion 32. The main portion 32 defines a slit 322 holding the flexible printed circuit board 16. The projection portion 34 engages in the slot 242. The flexible printed circuit board 16 passes through the slit 322 and the sleeve portion 24, into the securing case 20, and is secured in the lens barrel 14. The shaft portion 26 includes a securing portion 262 for securing the rotary disk 40.

The rotary disk 40 includes a disk portion 42 and a first gear portion 44. The first gear poriton 44 protrudes from the center of the sidewall of the disk portion 42. The disk portion 42 defines a securing slot 422 opposite to the first gear portion 44. The securing slot 422 has substantially the same size and shape as the securing portion 262. The securing portion 262 is secured in the securing slot 22. The first gear portion 44 has a plurality of first engaging teeth 442 around the periphery thereof.

The transmission follower 50 includes a mating portion 52, a second gear portion 54, and a rotary shaft 56. The second gear portion 54 protrudes from the center of the mating portion 52. The rotary shaft 56 connects to the second gear portion 54. The mating portion 52 defines a circular blind hole 522. The blind hole 522 has a plurality of third engaging teeth 524 on its interior surface, engaging the first engaging teeth 442. The second gear portion 54 has a plurality of second engaging teeth 542. The rotary shaft 56, the mating portion 52, and the second gear portion 54 are coaxially arranged.

The handle member 60 includes a base body 62 and a handle portion 64. The base body 62 includes a plurality of rack teeth 622 laterally arranged on the top surface. The rack teeth 622 engage the second engaging teeth 542. The base body 62 has a protrusion 624 formed on the bottom surface opposite to the rack teeth 622. The handle portion 64 protrudes from a side of the base body 62, near the rack teeth 622.

The rotary disk 40, the transmission follower 50, and the handle member 60 are mounted in mounting member 70. The mounting member 70 includes a bottom wall 72 and a sidewall 74. The bottom wall 72 defines a sliding slot 722 receiving the slidable protrusion 624. The sidewall 74 defines a shaft hole 744 and a sliding slot 742 (shown in FIG. 2). The shaft hole 744 receives the rotary shaft 56, and the sliding slot 742 receives the handle portion 64. The rotary shaft 56 is rotatable within the shaft hole 744. The handle portion 64 is slidable along the sliding slot 742.

The receiving box 80 receives the imaging unit 10 therein and includes a first box section 82 and a second box section 84. The first box section 82 and the second box section 84 have generally the same structures. The first box section 82 defines a first aperture 822 allowing outside light to penetrate into the receiving box 80. The second box section 84 defines a second aperture 842 aligned with the first aperture 822 and also allows outside light to penetrate into the receiving box 80. The first box section 82 defines two semi-circular, opposite first cutouts 824, accordingly, the second box section 84 defines two semi-circular, opposite second cutouts 844. The first cutouts 824 are aligned with the second cutouts 844. When the first box section 82 is attached to the second box section 84, the first cutouts 824 and the second cutouts 844 cooperatively define two circular spaces for rotatably receiving the sleeve portion 24 and the shaft portion 26, respectively.

FIG. 2 and FIG. 3 show an assembled camera module 100. The imaging unit 10 is secured to the rotary disk 40 by securing the securing portion 262 into the securing slot 422. The imaging unit 10 is received in the receiving box 80 and can be rotated to align the lens assembly 142 with one of the first aperture 822 and the second aperture 842. The first gear portion 44 is received in the blind hole 522 with the third engaging teeth 524 engaging the first engaging teeth 442. The handle member 60 is positioned below the transmission follower 50 with the rack teeth 622 engaging the second engaging teeth 542. The combination of the rotary disk 40, the transmission follower 50, and the handle member 60 is received inside the mounting member 70. The protrusion 624 of the handle member 60 engages in the sliding slot 722. The handle portion 64 passes out of the sliding slot 742. The rotary shaft 56 is rotatably received in the shaft hole 744.

Figure 4:
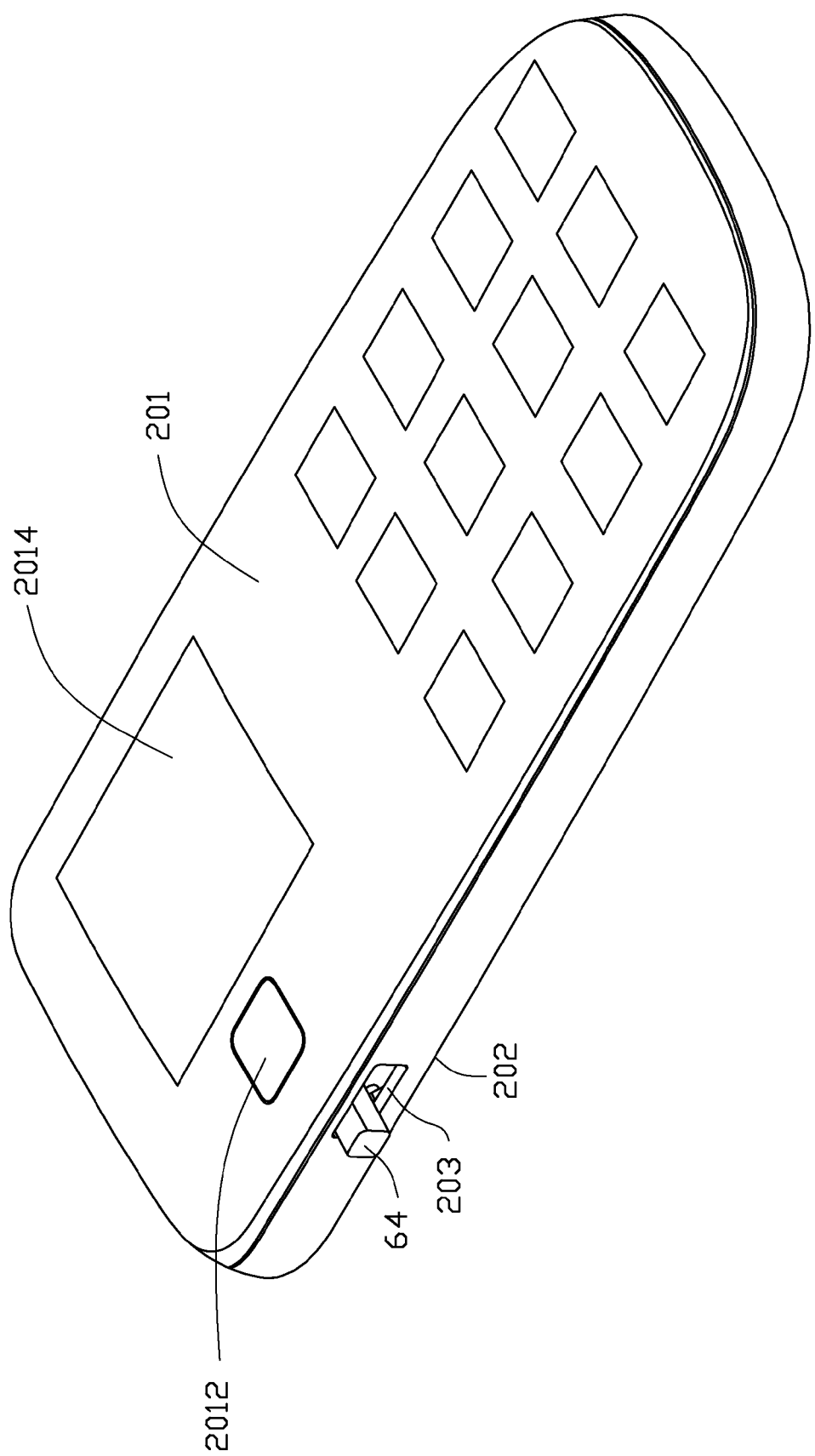
FIG. 4 is an isometric view of an exemplary portable electronic device using the camera module shown in FIGS. 1 through 4.
Figure 5:
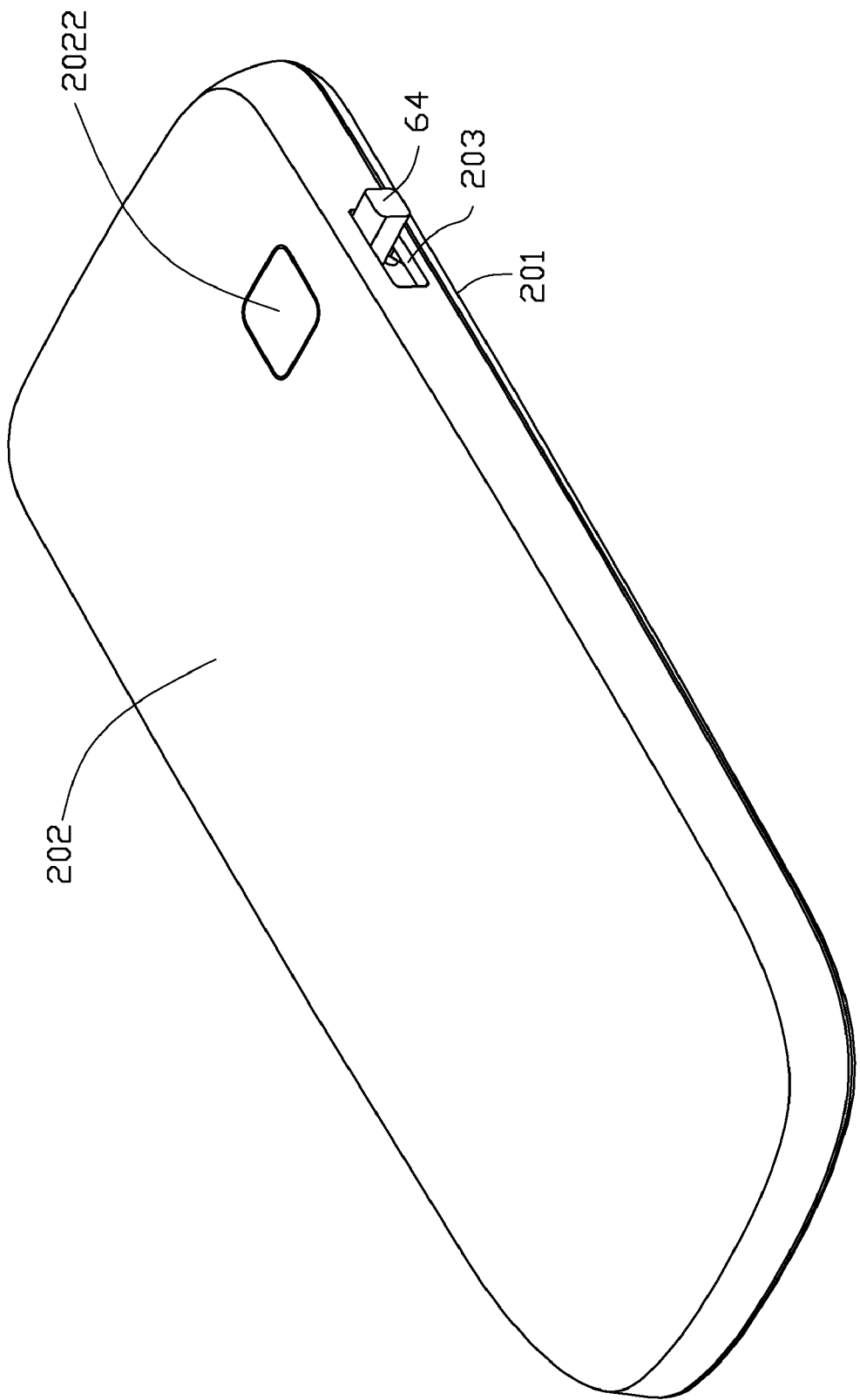
FIG. 5 is similar to FIG. 5 but viewed from another angle.

FIGS. 4 and 5 show an application of the camera module 100 in a portable electronic device 200. The portable electronic device 200 includes a front housing 201 and a rear housing 202. The front housing 201 has a first camera window 2012 and a display 2014. The rear housing 202 has a second camera window 2022 opposite to the first camera window 2012. The rear housing 202 defines an engaging slot 203 at the side.

During assembly, the camera module 100 is assembled inside the portable electronic device 200, exposing the handle portion 64 out of the engaging slot 203. The first box section 82 is secured to the front housing 201, and the second box section 84 is secured to the rear housing 202. The first aperture 822 of the receiving box 80 aligns with the first camera window 2012, and the second aperture 842 of the receiving box 80 aligns with the second camera window 2022. The sliding slot 742 is aligned with the engaging slot 203.

In use, when the lens assembly 142 is aligned with the first aperture 822, the light can pass through the first camera window 2012 and the first aperture 822 into the lens assembly 142. The user can take a self-portrait while viewing the image shown on the display 2014. The handle portion 64 can be operated within the engaging slot 203. Accordingly, the imaging unit 10 can be rotated to alternatively align the lens assembly 142 with the first camera window 2012 or the second camera window 2022.

Specifically, the handle portion 64 can be pushed to slide along the sliding slot 742. Due to the rack teeth 622 engaging with the second engaging teeth 542, the sliding of the handle portion 64 rotates the transmission follower 50. Accordingly, the rotary disk 40 rotates by engagement of the third engaging teeth 524 and the first engaging teeth 442. The rotation of the rotary disk 40 makes the imaging unit 10 rotate within the receiving box 80. The lens assembly 142 is rotated away from the first aperture 822 towards the second aperture 842, until the lens assembly 142 aligns with the second aperture 842. Thus, light can pass through the second camera waindow 2022 and the second aperture 842 into the lens assembly 142.

It is to be understood, however, that even through numerous characteristics and advantages of exemplary embodiments have been set forth in the foregoing description, together with details of the structure and function of the embodiments, the disclosure is illustrative only, and changes may be made in detail, especially in matters of shape, size, and arrangement of parts within the principles of the disclosure to the full extent indicated by the broad general meaning of the terms in which the appended claims are expressed.

What is claimed is:

1. A camera module, comprising
an imaging unit;
a rotary disk fixed to the imaging unit;
a transmission follower gear driving the rotary disk;
a handle member comprising a handle portion, the handle member engaging the transmission follower;
a mounting member defining a sliding slot, the handle portion slidably engaging into the sliding slot, the sliding of the handle portion relative to the sliding slot enables rotation of the transmission follower and an accompanying rotation of the rotary disk and the imaging unit;
wherein the rotary disk comprises a first gear portion having a plurality of first engaging teeth around its periphery; the transmission follower comprises a plurality of third engaging teeth attached on its interior surface for engaging the first engaging teeth.

2. The camera module as claimed in claim 1, wherein:
the handle member comprising a plurality of rack teeth;
the transmission follower comprises a second gear portion, the second gear portion having a plurality of second engaging teeth engaging the rack teeth.

3. The camera module as claimed in claim 2, wherein the imaging unit comprises a shaft portion, the shaft portion comprises a securing portion, the rotary disk defines a securing slot at the center, the securing portion fixed in the securing slot.

4. The camera module as claimed in claim 2, wherein:
the transmission follower comprises a mating portion, the second gear portion protruding from the mating portion at the center;
the mating portion defines a blind hole, the plurality of third engaging teeth attached on the interior surface of the blind hole.

5. The camera module as claimed in claim 1, wherein:
the imaging unit comprises a first box section and a second box section, the first box section defines a first aperture, the second box section defines a second aperture aligning with the first aperture;
the imaging unit further comprises a securing case, the imaging unit includes a lens barrel and a lens assembly, the lens assembly held by the lens barrel and rotated to alternatively align with the first aperture or the second aperture according to rotation of the rotary disk.

6. The camera module as claimed in claim 5, wherein the securing case has a shaft portion extending, the shaft portion comprises a securing portion, the rotary disk defines a securing slot at the center, the shaft portion fixed in the securing slot.

7. The camera module as claimed in claim 1, wherein the handle member further comprises a base body, the base body including a plurality of rack teeth laterally arranged on the top surface; the transmission follower comprises a second gear portion engaging the rack teeth; the handle portion protrudes from a side of the base body, near the rack teeth.

8. The camera module as claimed in claim 7, wherein:
the base body comprises a protrusion formed opposite to the rack teeth; and
the mounting member comprises a bottom wall, the bottom wall defining a sliding slot receiving the protrusion.

9. The camera module as claimed in claim 8, wherein the mounting member comprises a sidewall, the sliding slot defined through the sidewall.

10. The camera module as claimed in claim 8, wherein the mounting member comprises a sidewall, the sidewall defining a shaft hole; the transmission follower comprising a rotary shaft, the rotary shaft rotatably received within the shaft hole.

11. A portable electronic device, comprising:
- a front housing comprising a first camera window;
- a rear housing comprising a second camera window opposite to the first camera window and an engaging slot; and
- a camera module secured in and located between the front housing and the rear housing, the camera module comprising:
- an imaging unit;
- a rotary disk fixed to the imaging unit;
- a transmission follower gear-driving the rotary disk;
- a handle member comprising a handle portion, the handle member engaging the transmission follower;
- a mounting member defining a sliding slot, the handle portion slidably engaging into the sliding slot and the engaging slot, the sliding of the handle portion relative to the sliding slot enables rotation of the transmission follower and an accompanying rotation of the rotary disk and the imaging unit to alternatively align with the first camera window and the second camera window wherein the rotary disk comprises a first gear portion having a plurality of first engaging teeth around its periphery; the transmission follower comprises a plurality of third engaging teeth attached on its interior surface for engaging the first engaging teeth.

\* \* \* \* \*